July 8, 1941.  G. CAMILLI  2,248,606
ELECTROMAGNETIC INDUCTION APPARATUS
Filed Nov. 24, 1939   2 Sheets-Sheet 1

Inventor:
Guglielmo Camilli,
by Harry E. Dunham
His Attorney.

July 8, 1941.     G. CAMILLI     2,248,606
ELECTROMAGNETIC INDUCTION APPARATUS
Filed Nov. 24, 1939     2 Sheets-Sheet 2
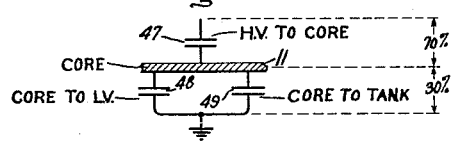
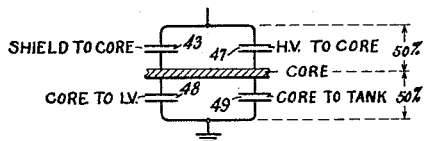
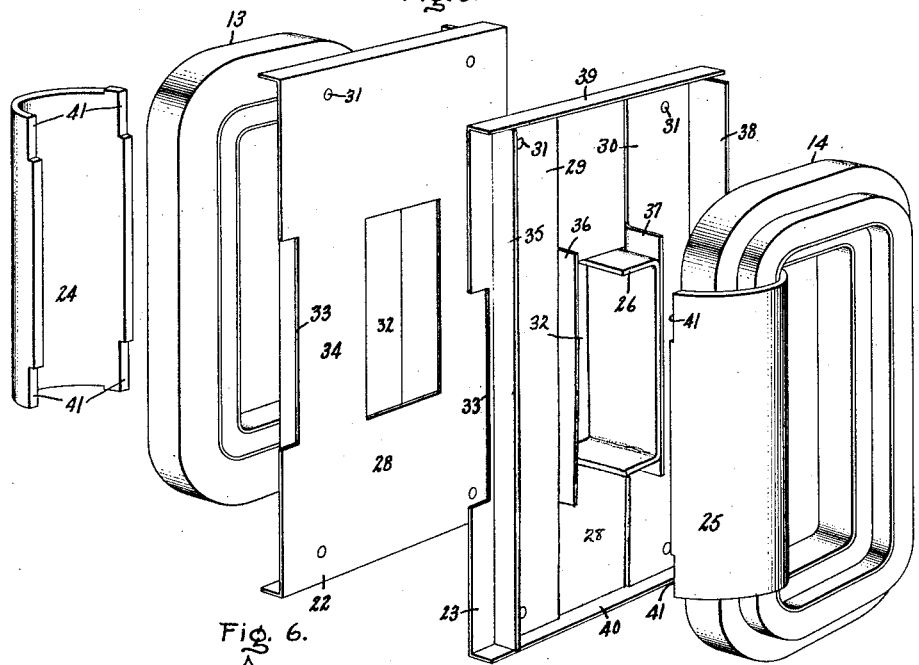
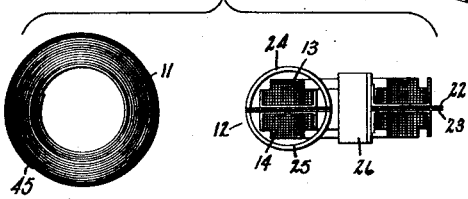
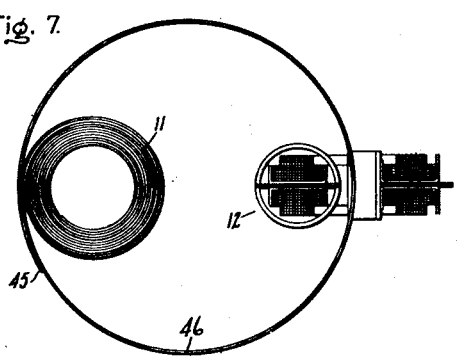
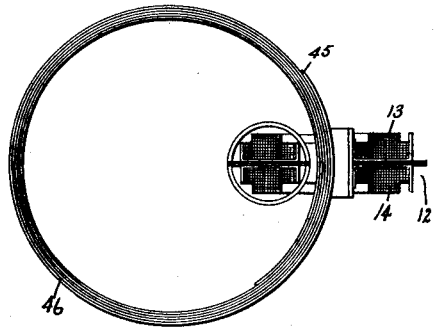
Inventor:
Guglielmo Camilli,
by Harry E. Dunham
His Attorney.

Patented July 8, 1941

2,248,606

UNITED STATES PATENT OFFICE 2,248,606

ELECTROMAGNETIC INDUCTION APPARATUS

Guglielmo Camilli, Pittsfield, Mass., assignor to General Electric Company, a corporation of New York Application November 24, 1939, Serial No. 305,834

8 Claims. (Cl. 175—356)

My invention relates to stationary induction apparatus and concerns particularly transformers having hollow cylindrical cores.

It is an object of my invention to provide electromagnetic induction apparatus having high space factor, good cooling characteristics, a relatively high ratio of surface area to winding-cross section, having good insulation characteristics with the insulation securely locked in place and with the arrangement producing a high insulation level in comparison with the amount of insulation used, and having a construction which may be produced easily and inexpensively with elimination of taping and clamping operations.

Other and further objects and advantages will become apparent as the description proceeds.

Carrying out my invention in its preferred form I utilize a wound strip magnetic core and a winding structure composed of a pair of similar windings placed side by side with stepped sides to form a cruciform cross-section of the winding structure and I insulate the windings from each other and from the core as well as insulate the core from the enclosing tank.

Figure 1:
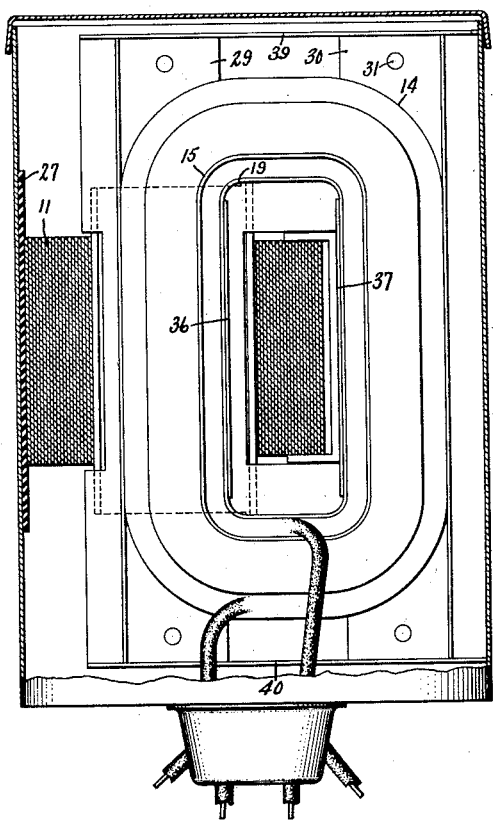
Figure 2:
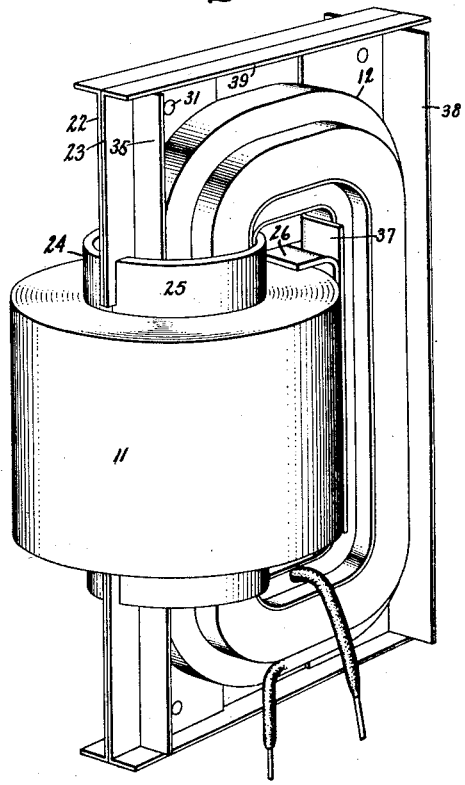
Figure 3:
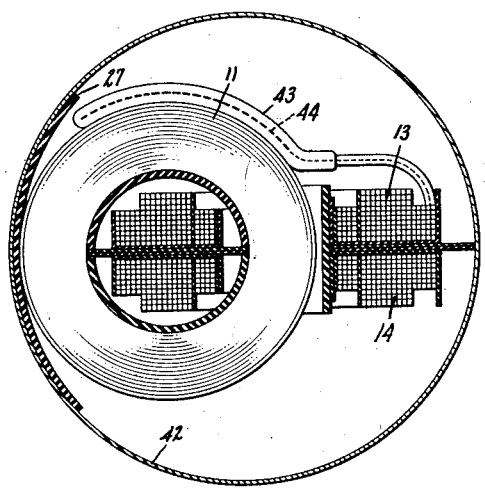
Figure 4:
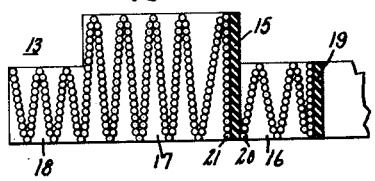

The invention will be understood more readily from the following detailed description when considered in connection with the accompanying drawings and those features of the invention which are believed to be novel and patentable will be pointed out in the claims appended hereto. In the drawings Figure 1 is an elevation partially in section of one embodiment of my invention, the enclosing casing being broken away in part to expose the interior construction. Figure 2 is a perspective view of the apparatus of Figure 1 removed from the enclosing casing. Figure 3 is a horizontal cross-section of the apparatus of Figures 1 and 2. Figure 4 is a fragmentary view in cross-section of one of the windings of the apparatus partially distorted in order to illustrate the construction more clearly. Figure 5 is an exploded perspective view of the portion of the apparatus shown in Figure 2. Figure 6 is a schematic diagram representing a horizontal section of the apparatus and illustrating a step in the process of applying the core to the winding structure. Figure 7 is a schematic diagram corresponding to Figure 6 to illustrate a further step in the assembling process. Figure 8 is another schematic diagram illustrating still a further step in the assembling process, and Figures 9 and 10 are circuit diagrams illustrating the problem of obtaining the proper voltage distribution between the high and low voltage windings, and the manner in which the problem is overcome in my construction. Like reference characters are utilized throughout the drawings to designate like parts.

In the drawings I have illustrated a stationary induction apparatus having a pair of independent conductive windings so that the apparatus may be used as a transformer. The apparatus illustrated is particularly useful for service as a street lighting transformer of the series type in which one of the windings must operate at relatively high voltage and the other, for the sake of safety, must be grounded, although the ratio of transformation may be only one to one. The apparatus illustrated utilizes a hollow cylindrical or annular magnetic core 11 composed of magnetic strip material spirally wound flatwise. The winding structure 12 consists of a pair of conductive windings 13 and 14 placed side by side and, since the ratio of transformation is one to one, the windings are made similar to each other with a symmetrical arrangement both with respect to position and insulation. The windings are insulated from each other and from the core, and for the sake of causing the maximum permissible voltage to be double that which might otherwise be obtained, the core is insulated from the enclosing tank. For obtaining the most efficient distribution of voltage between the insulation from the high voltage circuit to the core and from the core to ground, an electrostatic shield is provided for the core and connected to the high voltage winding.

The core 11 may consist of a strip of suitable low loss magnetic strip spirally wound flatwise into an annulus or hollow cylinder in such a manner as to be free from deleterious strains, as explained more in detail in United States Patent No. 2,160,588 to Granfield.

Each of the two windings comprising the winding structure 12 preferably has stepped sides in order to produce what might be called a cruciform cross-section of the winding structure 12 for the sake of obtaining an adequate cooling surface and relatively high space factor of the conductor material which must be fitted into the circular opening of the core 11. In order that each of the windings may be an integral unit and have the requisite configuration to produce a cruciform cross-section, they are provided with a relatively stiff insulating ring 15 of pressboard or other suitable material between an inner narrow section 16 and an intermediate wider section 17 supported by the ring 15, an outer narrow section 18 surrounding the intermediate wire section 17. For the purpose of better insulation and support a narrow insulating ring 19 also composed of suitable material, such as pressboard, is provided as a winding form around which the first turns of the narrow section 16 are wound. The arrangement is illustrated in Figure 4 in which the turns of wire are represented by the circular cross-sections of the individual wires, but the spacing between the turns is exaggerated in order to illustrate the principle. It will be understood that the wire may be continuous from one end to the other and that in winding the wire and going from the narrow section 16 to the wider section 17, a strip of material of the proper thickness to form the ring 15, and of slightly greater length than necessary to form a complete ring, is simply wound in with the next turn of wire after the section 16 has been completed, by winding the last turn 20. The next turn 21 is brought outside the insulating ring 15 by laying the strip of which it is composed under the wire 21 as that turn is started. In order to simplify the assembly, improve the cooling and prevent voids or air pockets in the insulation, taping is dispensed with in insulating the windings 13 and 14 and in binding the windings 13 and 14 to form the winding structure 12. Instead rigid insulating barriers are employed. The core 11 serves to bind the windings together. Since, as shown, the windings 13 and 14 are similar in mounting arrangement and also in shape and volume, they have the same capacity with respect to the cores. Thus the arrangement is symmetrical electrically as well as mechanically.

The insulation consists of a pair of sheet barriers 22 and 23 composed of flat sheets bent at certain edges and interposed between the windings 13 and 14 to insulate them from one another, a cylindrical insulating barrier composed of two halves 24 and 25, a bent strip 26 and a core-insulating barrier 27, all of which may be composed of suitable insulating material, such as pressboard. The barriers 22 and 23 each consist of a flat sheet 28 and longitudinal reinforcing strips 29 and 30. The strips 29 and 30 are secured to the sheets 28 by suitable means, such as non-conducting fibre rivets 31. The sheets 28 have central openings 32 for receiving one side of the core 11 and are provided each with a notch 33 of the same length as the opening 32 and adapted to receive the cylindrical insulators 24 and 25. A portion of the sheet 28 between the opening 32 and the notch 33, together with the strip 29, is surrounded by the core 11, and may be referred to as the surrounded side of the insulating barrier. The strips 29 and 30 are of sufficient width that they may have their edges 35, 36, 37 and 38 bent transversely and still maintain the remaining width of the strips 29 and 30 slightly greater than the surrounded side 34 and sufficient to embrace the windings 13 and 14 between the pair of transversely bent edges or flanges 35—36 and 37—38. The upper edges 39 and 40 of the sheets 28 may also be bent transversely to form flanges for a better insulation of the windings 13 and 14 from each other.

The cylindrical insulator 24—25 is notched at the ends along the joints between the two halves to form the recesses 41. The distance between the recesses corresponds to the length of the notches 33 in the sheets 28 and the depth of the recesses 41 corresponds to the thickness of the sheets 28 so that, as illustrated in Figure 2, the portions of the insulating cylinder 24—25 adjacent the joints fit into the notches 33 and openings 32 of the barriers 23 and 24, and the barriers 23 and 24 in turn fit into the notches formed by recesses 41 in the insulating cylinder 24—25. In this manner the insulating barrier 24—25 is locked in place and cannot slide axially or circumferentially. The insulating barriers 23 and 24 are, of course, locked by reason of the fact that the core 11 fits the opening 32 and the windings 13 and 14 fit inside the flanges 39, 40, 35 and 38. It will be observed that the sides of the windings surrounded by the core 11 fit against and within the strips 29 which are integral with the flanges 35 and 36, so that an electrostatic path through the joints in the cylinder 24—25 is closed and no insulation breakdown can occur in this direction between the windings and the core 11. The bent strip 26 which is interposed between the outside of the core 11 and the adjacent inner surfaces of the windings, together with the flanges 37 and the insulating winding forms 19 of the windings, in a similar manner prevent insulation breakdown between the outside of the core and conductive windings. The insulating barrier 27 which is in the form of a segment of a cylinder and is interposed between the core 11 and the enclosing tank 42 serves to insulate the core from the tank 42, which is assumed to be at ground potential.

The electrostatic shield 43 may consist of a sheet of conducting material, such as metal foil 44, laid along one surface of the core 11 but insulated therefrom, and the conducting material 44 is connected electrically to some portion of the high voltage winding 13 in order to increase the capacity from the high voltage winding to the core sufficiently to balance the capacity from the core to the low voltage winding 14 and the tank 42, which are both assumed to be at ground potential.

For increasing the voltage at which the high voltage winding may be operated, the tank 42 may be filled with a suitable insulating substance, such as liquid or plastic insulating material. I have found, for example, that a mixture of sand and wax combines good thermal properties with good insulating properties.

Since the conductive windings are form-wound and rigid insulating pieces are employed, the apparatus is assembled by applying the core to the conductive winding leg of the winding structure. This may be done in the manner described in the previously mentioned Patent No. 2,160,588 to Granfield. It will be understood that the winding structure is first assembled with the insulating barriers 22 and 23 against each other, the windings 13 and 14 against the insulating barriers 22 and 23, the insulating cylinder halves 24 and 25 fitting in to the notches 33 and the openings 32 and fitting around one side of each of the windings 13 and 14, and the bent piece 26 fitting in the far side of the opening 32. It will be understood that the flanges 35, 36, 37 and 38 are also bent to the positions shown. The core is then wound around the insulating cylinder 24—25 which constitutes the outer shell of the winding leg. Briefly, a coil of magnetic strip wound spirally flatwise tightly into the size and shape of the finished core 11 and heat-treated to give the turns a permanent set is brought into proximity with the conductive winding structure, as shown in Figure 6. The end 45 of the magnetic strip is then separated from the coil 11 and passed through the winding structure 12 around the conductive winding leg to form a loop 46. The end 45 is fastened to loop 46, and the coil 11 and the loop 46 are rotated until all the material is transferred from the coil 11 to the inside of the loop 46, as shown in Figure 8. Thereupon, the end 45 of the strip is unfastened from the loop 46 and the strip is collapsed to form a compact core of the same size and shape as the original heat-treated coil of strip, as shown in Figures 1, 2 and 3.

It will be seen that the form of the windings and the rigid insulation provided gives ample opportunity for cooling currents if a fluid insulating medium is employed and ample space for receiving the insulating and cooling substance if a semi-solid insulating medium is employed. Furthermore, the shape of the rigid insulating pieces is such as to close any possible paths for voltage breakdown.

In view of the fact that the arrangement is entirely symmetrical, the low voltage winding is insulated for the same voltage as the high voltage winding, although such high insulation of the low voltage winding is unnecessary if the core is operated at ground potential. By insulating the core I am able to use the transformer at double the voltage for which the windings are insulated. The core is insulated by means of the barrier 27 interposed between the core and the tank 42. It will be understood that the full advantage of insulating the core would not be obtained if the arrangement were not symmetrical, for in that case the increase in operating voltage would not be 100%, but merely the amount of the low voltage for which the low voltage winding might be insulated in an unsymmetrical arrangement. The double barriers 22 and 23 insulate the winding from each other for the double voltage.

Even with a fully symmetrical arrangement I have found that the full advantage of insulating the core may not be obtained if there is unequal capacity distribution between the high voltage winding and the low voltage winding. For example, as shown in Figure 9, if the capacity from the high voltage winding to the core represented by the condenser 47 is less than the combined capacity from the core to ground by way of the low voltage winding represented by the condenser 48, and from the core to ground by way of the tank represented by the condenser 49, the high voltage winding may be subjected to a greater potential difference than the low voltage winding, for example, in the ratio of 70% to 30%. In order to equalize the capacity and voltage distribution, the electrostatic shield 43 is added and the capacity thereof is made such that the total capacity from the high voltage winding to the core equals the total capacity from the core to ground so as to form a series parallel circuit, as represented in Figure 10, with equal capacity and voltage distribution.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. A transformer comprising an enclosing tank, an annular wound strip magnetic core, a pair of similar conductive windings placed side by side linking said core and having stepped sides to form a winding structure having a cruciform cross section, an insulating barrier between the windings, an insulating cylinder between the core and the winding structure, an insulating barrier between the core and the tank, an electrostatic shield at the surface of the core insulated therefrom and electrically connected to one of said windings whereby said latter winding may be operated at a voltage approximately twice the voltage for which either of said windings is insulated from the core.

2. An electromagnetic induction apparatus comprising an enclosing tank, an annular magnetic core, a high voltage winding and a low voltage winding similar to each other with like capacities to the core, placed one beside the other and linking said core, an insulating barrier between the windings, an insulating cylinder between the core and the windings, and an insulating barrier between the core and the tank whereby the high voltage winding may be operated at twice the potential above ground for which either of the windings is insulated.

3. An electromagnetic induction apparatus comprising an enclosing tank, an annular magnetic core, a plurality of conductive windings placed side by side linking said core, insulating barrier means between the windings, an insulating cylinder surrounding the windings within said core, and an insulating barrier between the core and the tank, whereby the core acquires a potential intermediate between the highest and lowest winding potentials to diminish the strain in the core-to-winding insulation.

4. An electromagnetic induction apparatus comprising an annular magnetic core, a pair of similar conductive windings placed side by side with like capacities to the core, and linking the core, an insulating barrier between the windings and an insulating cylinder surrounding the windings within the core, whereby the core acquires a potential intermediate between the winding potentials to diminish the strain in the core-to-winding insulation.

5. An electromagnetic induction apparatus having an annular magnetic core and a winding structure therefor, comprising a pair of conductive windings substantially similar and an insulating barrier therebetween, each of said windings having a stepped outline to produce a winding structure having a cruciform cross section, each of said windings comprising a relatively narrow inside portion wound upon an insulating form, a relatively wide insulating band of relatively stiff material surrounding the said inner portion, a mid portion forming an electrical continuation of the inner portion surrounding the insulating band and of substantially the same width, and an outer portion electrically forming a continuation of the mid portion, of substantially the same width as the inside portion, and surrounding the inner portion of the winding.

6. In an electromagnetic induction apparatus comprising an annular magnetic core and a pair of substantially similar conductive windings placed side by side and linking said core, an insulating structure comprising an insulating barrier for separating the windings and an insulating cylinder for separating the core from the winding sides which it surrounds, said barrier comprising a pair of flat insulating members in sheet form each having an opening through which a side of an annular core is adapted to pass and a side which is adapted to be surrounded by the annular core, the edge of the sheet material on the side of the opening away from the surrounded side of the sheet being bent transversely to help to insulate the conductive windings from the outer surface of the core, both edges of the surrounded side of the insulating sheet material also being transversely bent to assist in insulating the surrounded sides of the conductive winding from the inside surface of the core, the insulating cylinder being split in two portions and notched at the ends along the line of contact of the two halves of the split cylinder, the outer edge of the surrounded side of the sheet material also being notched whereby portions of the insulating barrier fit into the notches when the insulating cylinder is locked in place in the core, the transversely bent portions of the surrounded side of the sheet material being within the insulating cylinder whereby the breakdown of potential between the halves of the insulating cylinder is prevented.

7. An electromagnetic induction apparatus comprising an enclosing tank, a magnetic core, a pair of conductive windings referred to as a high voltage winding and as a low voltage winding respectively, linking said core and symmetrically arranged with respect thereto, being symmetrically insulated therefrom, and an electrostatic shield electrically connected to the high voltage winding extending along a portion of the core and insulated therefrom, the core also being insulated from the tank, the dimensions of the shield being such as to balance the electrostatic capacity between the high voltage winding and the core with the sum of the electrostatic capacities from the core to the low voltage winding and from the core to the tank, whereby the core is maintained at an electrostatic potential substantially midway between the potential of the high voltage winding and the ground potential of the low voltage winding and tank.

8. In an electromagnetic induction apparatus comprising an annular magnetic core and a pair of substantially similar conductive windings placed side by side linking said core, an insulating structure comprising an insulating barrier for separating the windings and an insulating cylinder for separating the core from the winding sides which it surrounds, said barrier comprising flat insulating sheet material having an opening through which a side of an annular core is adapted to pass and having a side which is adapted to be surrounded by the annular core, the edges of the surrounded side of the insulating sheet material being transversely bent to assist in insulating the surrounded sides of the conductive winding from the inside surface of the core, the insulating cylinder having a joint, the transversely bent portions of the surrounded side of the sheet material being within the insulating cylinder along the joint whereby voltage breakdown at the joint of the insulating cylinder is prevented.

GUGLIELMO CAMILLI.